(12) United States Patent
Owen

(10) Patent No.: US 6,553,709 B1
(45) Date of Patent: Apr. 29, 2003

(54) DABBLER

(76) Inventor: Neil Owen, 461 Slattery Blvd., Shreveport, LA (US) 71104

( * ) Notice: Subject to any disclaimer, the term of this patent is extended or adjusted under 35 U.S.C. 154(b) by 0 days.

(21) Appl. No.: 09/624,416

(22) Filed: Jul. 24, 2000

(51) Int. Cl.[7] ............................................. A01M 31/06
(52) U.S. Cl. .................................................. 43/3; 446/153
(58) Field of Search ........................... 43/3; 119/707; 446/268, 153, 156, 157, 158, 165, 163, 162; D21/546; D22/125; A01M 31/06

(56) References Cited

U.S. PATENT DOCUMENTS

| | | | | |
|---|---|---|---|---|
| 1,828,034 A | * | 10/1931 | Einfalt | |
| 2,443,040 A | * | 6/1948 | Jones | |
| 2,460,128 A | * | 1/1949 | Greenleag | |
| 2,480,390 A | * | 8/1949 | Thompson | |
| 2,691,233 A | * | 10/1954 | Richardson | |
| 2,799,960 A | * | 7/1957 | Riley | |
| 2,814,146 A | * | 11/1957 | Propp | |
| 2,835,064 A | * | 5/1958 | Webb | |
| 3,000,128 A | * | 9/1961 | Mcada | |
| 4,612,722 A | * | 9/1986 | Ferrell | 43/3 |
| 5,377,439 A | * | 1/1995 | Roos et al. | 43/3 |
| 5,775,022 A | * | 7/1998 | Sumrall et al. | 43/3 |

* cited by examiner

Primary Examiner—Peter M. Poon
Assistant Examiner—Andrea Valenti
(74) Attorney, Agent, or Firm—Kean, Miller, Hawthorne, D'Armond, McCowan & Jarman, L.L.P.; William R. Coenen, III; Russel O. Primeaux

(57) ABSTRACT

The apparatus includes three 1.5 volt D-size batteries and two electric motors with arms and/or shafts extending to the head and tail area. The apparatus is mounted inside a commercial duck decoy and provides vertical head movement and propulsion with resulting water splashing and rippling actions when the decoy is afloat. These motions enhance the attraction of the decoys to flying waterfowl.

3 Claims, 2 Drawing Sheets

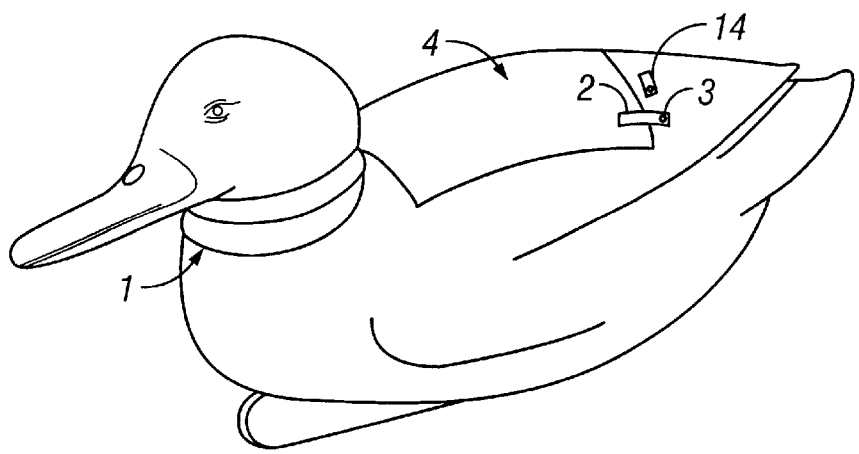
FIG. 1
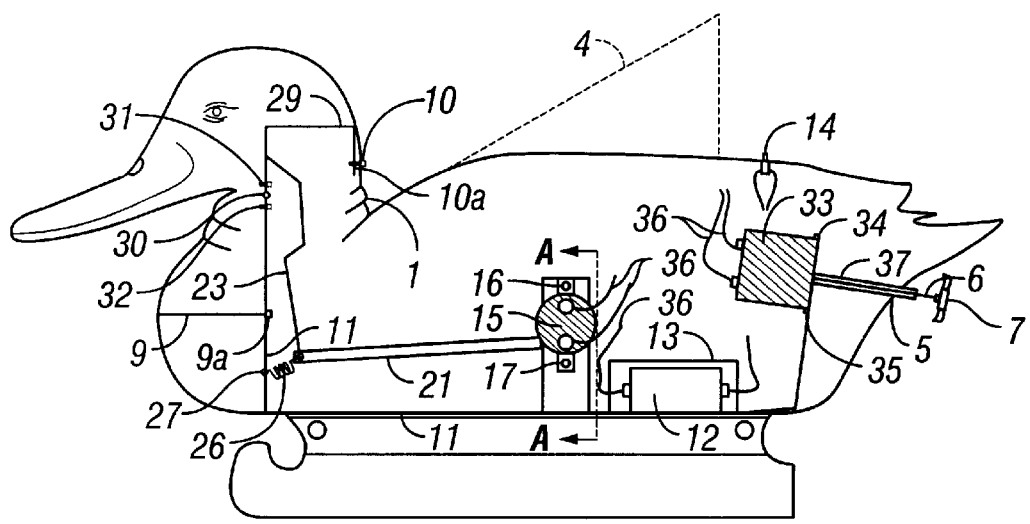
FIG. 2
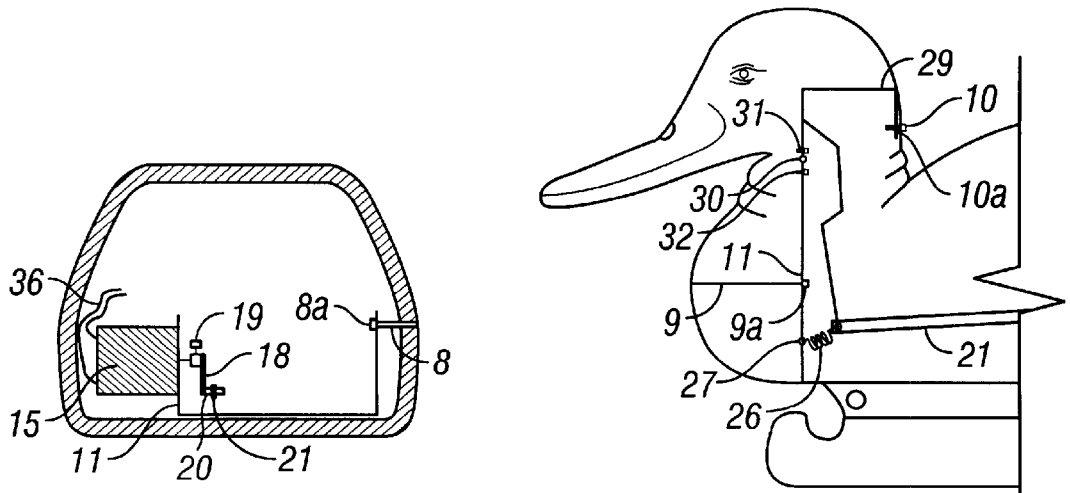
FIG. 2A  FIG. 2B

DABBLER

TECHNICAL FIELD

This invention relates to a battery-powered apparatus providing a movable head and propulsion device for installation in waterfowl decoys, so as to provide animation of the decoy including water splashing and rippling actions for enhanced attraction by waterfowl. The apparatus is designed to facilitate installation in various commercial waterfowl (duck & goose) decoys of hollow plastic construction.

BACKGROUND OF THE INVENTION

Waterfowl today have adapted to the long-lasting ways of the hunter. In this same respect, the hunter must adapt his way of hunting to suit changing needs. The hunters of old, hunt with stationary decoys to attract ducks but this is no longer a given. The ducks that we hunt today have, for the most part, been hunted before, moreover, their ingrained wild sense has developed from generations of evolution and therefore are weary of duck decoys sitting still on a motionless pond. Thus, in adapting the way waterfowl hunters hunt, one must make his decoy-spread look as lifelike as possible. This can be achieved by adding lifelike motion to a decoy, after all, ducks can tell the difference between live ducks and stationary ducks by detecting motion. This is why motion in decoys is probably the most important factor in duck hunting. Past attempts to provide motion to waterfowl decoys have been far short from a realistic appearance. None of the prior inventions provide a lifelike movement of the head and a propulsion device that causes propulsion, splashing and water rippling to create the illusion of a live waterfowl in a hunters decoy spread.

SUMMARY OF THE INVENTION

The present invention relates to a battery-driven motor (Part 15), which drives an arm which is connected to another arm that is connected to the detached head of a waterfowl decoy that lowers and raises the head of a waterfowl to simulate a duck dabbling for food and water while afloat.

The present invention also relates to a battery-driven motor (Part 33), which drives an output shaft of which is attached a propeller. The rotation of the propeller, propels the decoy through the water in addition to providing splashing and water rippling. This in conjunction with the head movement creates an illusion of a live waterfowl.

The operating mechanism consists of three D-cell batteries, a battery holder, an on-off switch, two electric motors, a rotary arm, driving arm and dabbling arm all mounted on a mounting bracket designed for installation into the hull of a decoy.

The outfitted decoy constantly swims, and moves its head up and down simulating the movements made by a live duck feeding in its natural habitat. Its electric motors are water sealed and will endure hard hunting conditions. They are powered by three easily changed D-cell alkaline batteries that have an operating life of 30 hours or more.

BRIEF DESCRIPTION OF THE DRAWINGS

The present invention will be more easily understood by reference to the following detailed description when read in conjunction with the attached drawings, wherein:

FIG. 1 is an oblique view of the commercial duck decoy in which the apparatus is mounted, including a modified neck, external switch and lid with latch to reach the apparatus.

FIG. 2 is an oblique view of the apparatus mounted inside of a commercial duck decoy.

FIG. 2A is a cross-section from FIG. 2 and shows the operations mechanism of the forward portion of the apparatus as noted on FIG. 2.

FIG. 2B is a cutaway section of FIG. 2 and shows the details of the dabbling arm and hinge.

DETAILED DESCRIPTION OF THE DRAWINGS

Figure 3:
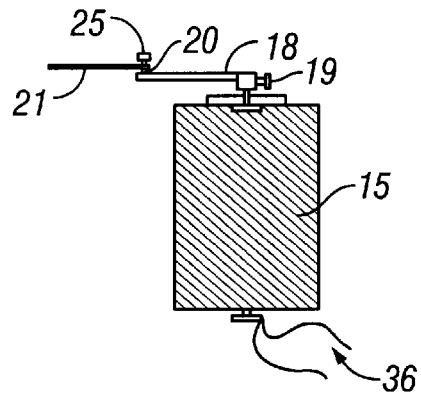
FIG. 3 is a top view of the front motor and it shows its attachment to the rotary arm.
Figure 4:
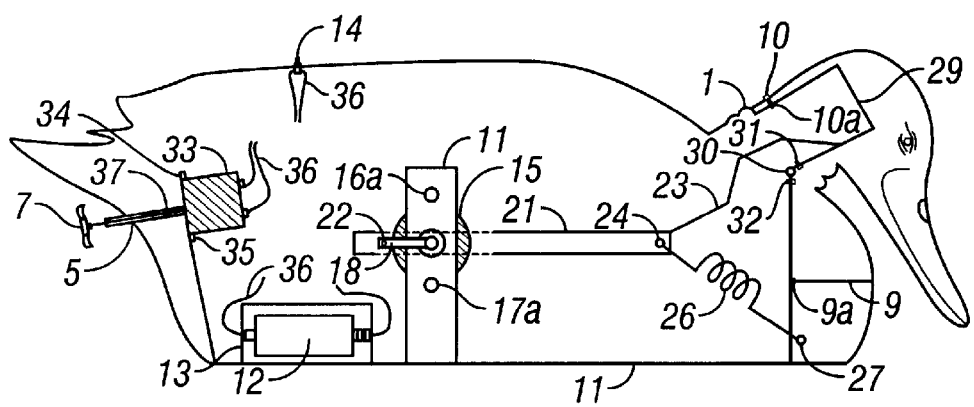
FIG. 4 is an oblique view of the apparatus in the extended position.
Figure 5:
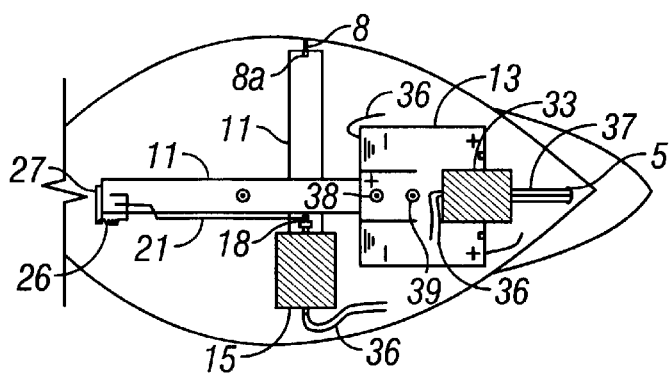
FIG. 5 is a top view of the apparatus installed in a commercial duck decoy.
Figure 6:
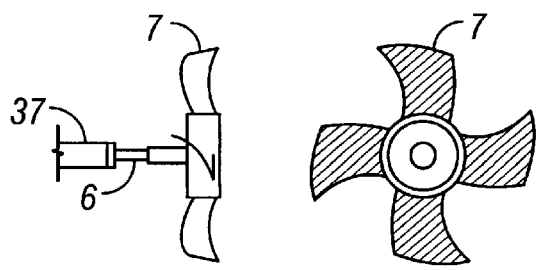
FIG. 6 is an oblique and aft view of the four blade propeller.

The apparatus is designed for compactness and for ease of assembly and incorporation into a waterfowl decoy.

The Bracket (11) is made from rolled cold steel and is shaped to contain the primary components of the apparatus for facilitation of assembly into the decoy. Part 15 consists of a commercial 4.5 volt low speed electric motor which is secured to the bracket (11) by fasteners (16) (17) (rivets, eyelets or brads) through bracket holes (16a) (17a). The no-load speed of the motor (15) is approximately 45 rpm, which results in an operating speed under load of approximately 41 rpm.

The rotary arm (18) is connected to the output shaft of the motor (15) by a set screw (19). The distal end of the rotary arm (18) has a perpendicularly projecting pivot shaft (20). Said pivot shaft (20) connects to a driving arm (21) through a pivot hole (22) and is secured with a rubber end cap (25). The distal end of the driving arm connects to the dabbling arm (23) through a pivot hole (24) in the driving arm (21). An eight coil low tension spring (26) attaches to the dabbling arm (23) at the confluence of the dabbling arm (23) and the driving arm (21). The other end of the spring (26) is attached to a pivot rod (27) which is welded to the bracket (11). The spring (26) provides the tension necessary to control the speed of the motor (15) return the decoy's head to the upright position when not in use, and assist the motor (15) in completing its turn when it reaches its apex.

The dabbling arm (23) at its distal end connects to the head bracket (29) through a weld. The head bracket (29) then connects to the bracket (11) through a hinge (30). The hinge (30) connects to both the bracket (11) and the head bracket through fasteners (31) (32) (rivets, eyelets or brads).

The rotation of the motor (15) causes all brackets, rods, arms and springs to work in concert to oscillate the decoy's head up and down.

The aft motor (33) consists of a commercial 2.5 volt moderate speed electric motor which is secured to the bracket (11) by fasteners (34) (35) (rivets, eyelets or brads). The no load speed of the motor (33) is approximately 718 rpm, which results in an operating speed under load of approximately 454 rpm. The shaft of the motor (6) exits the decoy through an aft hole (5). Said shaft (6) is sheathed in a round plastic tube (37) that allows the motor shaft (6) to rotate freely while preventing water from entering the aft hole (5) while afloat. The shaft (6) is then connected to a removable propeller (7). The propeller not only provides the decoy with propulsion in water but also creates a rippling and splashing effect on the water which is particularly attractive to ducks.

A commercial battery holder (13) is secured to the bracket (11) by fasteners (38) (39) (rivets, eyelets or brads). The battery holder (13) includes positive and negative contacts connected to the switch (14) and motors 15 and 33 by wiring (36). The battery holder (13) is sized for three 1.5 volt D-cell batteries (12).

The neck of the decoy (1) is made of a closed-cell neoprene composite material designed to provide flexibility and durability during the downward and upward oscillation of the waterfowl decoy's head during operation.

Lid tab (2) is a semi plastic strip secured to the top of the waterfowl decoy with a fastener (3) (rivet, eyelet or brad) to act as a latch for the lid flap (4). Holes are drilled or punched on the top back of the decoy in the proper location to receive the fastener (3) for the lid tab (2). In addition a hole is cut in the top of the decoy to receive the switch (14). The switch (14) is attached to the decoy with fasteners (rivets, eyelets or brads).

The commercial duck decoy is prepared by cutting a flap (4) in the top to provide an opening for insertion of the apparatus. In addition, the head of the decoy is cut off at the base of the neck to allow the head to become moveable and allow insertion of the forward part of the apparatus into the head of the decoy. Moreover a holed is drilled in the aft portion of the decoy (5) to allow the propeller shaft (6) to exit the duck decoy and receive the four blade propeller (7).

The apparatus is inserted through the lid flap (4) and held in position while fasteners (8) (9) (10) (rivet, eyelet or brad) are used to secure the mounting bracket (11) through bracket holes (8a) (9a) (10a) to the decoy.

The decoy package is delivered to the user without batteries (12) and with the propeller (7) enclosed within the body of the decoy. Upon receipt, the user will remove the propeller (7) from the decoy and lightly screw the propeller to the propeller shaft (6) in a counterclockwise direction. The user will then insert three 1.5 volt D-cell alkaline batteries (12) in the battery holder, (13), close the lid flap (4), secure the lid tab (2) and activate the switch (14) to the "on" position. The operating decoy is then ready for placing afloat to attract waterfowl by the movement of the head and the movement and splashing of the water surrounding the decoy.

I claim:

1. An improved motorized duck decoy, comprising:
   (a) a decoy body, said decoy body having a continuous hollow cavity, said continuous hollow cavity extending without interruption throughout said decoy body, said decoy body being devoid of a vertically extending bifurcation;
   (b) an aft motor, said aft motor imparting propulsion to said decoy;
   (c) a shaft, said shaft connected to said aft motor in a manner such that rotational motion is delivered to said shaft;
   (d) a propeller connected to the distal end of said shaft, said propeller being oriented such that said propeller partially protrudes above the surface of the water, said decoy is propelled through the water, and a rippling and splashing effect that is attractive to live waterfowl is created;
   (e) a forward motor, said forward motor being battery powered and containing a horizontal output shaft;
   (f) a rotary arm, said rotary arm being connected to said horizontal output shaft at a right angle and rotating in a vertical plane;
   (g) a pivot shaft, said pivot shaft being connected to the distal end of said rotary arm through a pivot hole;
   (h) a driving arm pivotally connected to said pivot shaft, said driving arm being capable of movement in a substantially horizontal direction, such that the circular rotation of said rotary arm moves said driving arm alternately forward and backward;
   (i) a dabbling arm connected to the distal end of said driving arm at an angle perpendicular to said driving arm, said dabbling arm being hingedly secured near its midpoint and pivotally moving in a vertical plane; and
   (j) a decoy head attached to the upper end of said dabbling arm, wherein the entire said decoy head moves forward and backward in a bobbing motion that corresponds to the pivotal movements of said dabbling arm and said driving arm, wherein at least a portion of said decoy head protrudes below the surface of the water at the extremity of its forward bobbing motion, wherein said decoy head does not twist from side to side.

2. The duck decoy as described in claim 1, said decoy further comprising a switch, said switch allowing a user to selectively operate said aft motor and said forward motor.

3. An improved motorized duck decoy comprising:
   (a) a decoy body, said decoy body having a continuous hollow cavity, said continuous hollow cavity extending without interruption throughout said decoy body, said decoy body being devoid of a vertically extending bifurcation;
   (b) a forward motor, said forward motor being battery powered and containing a horizontal output shaft;
   (c) a rotary arm, said rotary arm being connected to said horizontal output shaft at a right angle and rotating in a vertical plane;
   (d) a pivot shaft, said pivot shaft being connected to the distal end of said rotary arm through a pivot hole;
   (e) a driving arm pivotally connected to said pivot shaft, said driving arm moving in a substantially horizontal direction, such that the circular rotation of said rotary arm moves said driving arm alternately forward and backward;
   (f) a dabbling arm connected to the distal end of said driving arm at an angle perpendicular to said driving arm, said dabbling arm being hingedly secured near its midpoint and pivotally moving in a vertical plane;
   (g) a decoy head attached to the upper end of said dabbling arm, wherein the entire said decoy head moves forward and backward in a bobbing motion that corresponds to the pivotal movements of said dabbling arm and said driving arm, wherein at least a portion of said decoy head protrudes below the surface of the water at the extremity of its forward bobbing motion, wherein said decoy head does not twist from side to side.

* * * * *